Patented June 12, 1934

1,962,552

UNITED STATES PATENT OFFICE 1,962,552

MILK PRODUCTS, AND METHOD OF PRODUCING SAME

Arthur C. Dahlberg, Geneva, N. Y.

No Drawing. Application October 27, 1931, Serial No. 571,456

11 Claims. (Cl. 99—11)

This invention relates to manufacture of edible soluble casein and the manufacture of milk products containing increased proportions of casein and, preferably, reduced proportions of lactose.

In its broadest aspect, the invention contemplates the production of edible food products composed essentially of milk and having incorporated therein a combination of edible soluble casein, a slowly reacting weak alkaline compound of a univalent cation and a bivalent cation slowly reacting alkaline compound, the finished product possessing properties and characteristics approaching those of normal milk with the exception that it has a reduced proportion of lactose.

A further object of the invention is to produce an edible soluble casein which may be marketed as a product in and by itself, such casein having a low lactose content but having substantially the same properties, or characteristics, as it would possess if it contained all the other normal milk solids not fat. In other words, the invention seeks to produce, as a marketable product, casein which will retain its fresh flavor at a better advantage over longer periods of time and will possess properties closely resembling those of casein as it originally exists in normal milk.

A further object of the invention is to produce casein by a method wherein the whipping properties of ice cream mixes, in which the casein is incorporated, may be controlled at will.

More specifically, the invention contemplates a method of producing casein wherein acid precipitated casein first has the whey and free acid washed or removed therefrom and is afterwards combined with a univalent cation slowly reacting weak alkaline compound, such as baking soda, and with a compound of a bivalent cation slowly reacting weak alkaline, such as calcium hydroxide. The use of these combined alkaline materials imparts to the finished casein properties substantially corresponding to those of casein as it existed originally in normal milk. Furthermore, the combined use of these alkaline elements renders it possible to control the whipping properties of ice cream mixes containing the casein. That is, if the casein is incorporated in an ice cream mix, the overrun of the mix can be increased by reducing the portion of calcium salts or the whipping properties may be curtailed by increasing the portion of calcium salts or like materials.

In accordance with the present invention, the preferred method consists in precipitating the casein of normal milk by the acid process wherein skimmed milk is heated to 94 to 96 degrees F. and an acid, usually diluted hydrochloric acid, added slowly while the milk is rapidly agitated. The addition of acid may be stopped when the casein is precipitated, but to secure more uniform results it is better to continue adding the acid to the whey until the latter has a pH value of 4.1 to 4.5. At this hydrogen ion concentration the whey usually shows a total titratable acidity of approximately 0.48–0.50 per cent. The pH value may be determined by the colorimetric method of Sharp and MacInerney (Journal of Biological Chemistry 70, p. 729, 1926). This entire acid treatment, although described in detail, is usual present-day practice in the dairy industry. After the precipitation of casein, the whey is drawn off and the curd or casein washed at preferably 80 to 90 degrees F. to eliminate the free acid. Preferably, two or three washings are had. To the wet curd there is then added the univalent cation slowly reacting weak alkaline compound and the bivalent cation slowly reacting weak alkaline compound. In one formula, it might be said that to the curd derived from 100 pounds of skimmed milk there is added 0.1 of a pound of baking soda, $HNaCO_3$, dissolved in ten times its weight of water. This solution is added to the curd slowly while the curd is being stirred. There is added to the batch of curd 0.05 of a pound of calcium hydroxide $Ca(OH)_2$, mixed with ten times its weight of water. This calcium compound is likewise slowly added to the curd while the latter is being stirred. It is immaterial which of the compounds is added first. The use of weakly dissociated compounds, diluted with water, and the rapid stirring of the curd during their addition, prevents over-neutralization of the casein and, thereby, greatly improves its flavor and its ability to retain its fresh flavor during storage. After combining these compounds with the curd, the mix is then heated to pasteurizing temperature and it dissolves to make a liquid casein solution, which is then dried by any of the commercial forms of apparatus for producing dry milk powder. The resulting product at this stage is soluble, edible casein.

In lieu of baking soda other materials such as ammonium or potassium carbonate, or any other univalent cation slowly reacting weak alkaline compounds which are not highly dissociated may be used. Likewise, in lieu of the calcium hydroxide, magnesium hydroxide, or other compounds of bivalent metals not highly active may be utilized. The casein thus produced has been found to have substantially all the characteristics which it possesses originally in normal milk. This is believed to be due to the use of the bivalent cation compounds. The casein is also readily soluble, its flavor or the flavor of food products in which it is used is not objectionable, and the color of the casein itself is substantially untainted. Also, it has been found that by the combined use of alkaline compounds as above described, characteristics of the soluble casein can be varied or adjusted so as to meet requirements when used in various products. For instance, where the casein is incorporated in ice cream mixes, the whipping or overrun in the mix is readily controlled by varying the proportion of the baking soda and the calcium hydroxide, or their equivalents. That is, by increasing the calcium hydroxide content with respect to the baking soda content, the whipping or overrun in the ice cream mix will be reduced and, on the contrary, where the calcium hydroxide is diminished the whipping or overrun properties of the mix will be increased.

As mentioned, the precipitation of the casein from the skimmed milk by the acid process is carried out in accordance with the ordinary every-day practices. While the present invention is not limited to the exact details given, so far as the addition of the alkaline compounds is concerned, it might be stated that the acidity of the casein will be found to be correctly adjusted when it has been returned to the approximate hydrogen ion concentration of milk, i. e., pH 6.5 to 6.8. Any method of determining hydrogen ion concentration can be employed, but that of Sharp and MacInerney has proven satisfactory. With this hydrogen ion concentration, one gram of the dry curd, which is approximately the same as three grams of the wet curd will require approximately one to one and a half c. c. of N/10 sodium hydroxide to produce neutrality, using phenolphthalein as indicator. Increased solubility may be imparted to the casein by increasing the quantity of baking soda or by decreasing the quantity of lime, or the equivalent of these materials. Also, to facilitate solution of the casein, the acid precipitated casein may be ground before or after the neutralized salts are added, or the particles may be more finely divided by passing the casein through a colloidal mill before or after the addition of the neutralizing salts. In any event, the casein readily dissolves when it is subjected to a pasteurization temperature of 145 degrees F. or higher. At this time, other dissolved chemicals may be added as desired. The dissolved casein can be used fresh or it may be held for a short period of time in a refrigerator, or it can be preserved for months by being frozen, sweetened, or by being condensed or dried. Each method has certain advantages but the dried soluble casein or the dried soluble casein combined with other milk solids has especial advantages from a marketing standpoint. For instance, the dried casein produced in accordance with the foregoing method can have added thereto sugar to compensate in part or totally for the lactose content of the original milk, said lactose content having been removed during the acid treatment before mentioned. This incorporation of sugar with the casein not only improves the keeping qualities of the product but also increases the rate of solubility. The sugar added to the casein will preferably be sucrose or dextrose, or other sweetening sugars.

If desired, skim milk can be added to the pure casein derived from the method above described, or to the casein combined with sugar. The skimmed milk, in liquid form, can be combined with the casein, or casein and sugar, while the milk is either hot or cold. It will serve as a solvent for the other materials and upon being dried the resulting dry product will be especially adapted for use in the manufacture of ice cream. With such a product there need be added only cream of the proper butter fat content, sweetening and flavoring ingredients in order to obtain a necessary mix for producing ice cream. Such a mix will produce ice cream of the most desirable quality for the following reasons. There being no lactose in the casein product used in the mix, or reduced proportions of lactose in the milk solids not fat portion of the mix, the lactose of the finished ice cream is easily kept below the saturation point of the water content of the mix even though the percentage of milk solids not fat is rather high. As a consequence, there is no precipitation of lactose and the finished ice cream will possess a smooth velvety characteristic. Furthermore, in the freezing of the ice cream the whipping or overrun is under perfect control, as before mentioned.

It will be appreciated that in some instances the use of the casein is such that the bivalent cation compound may be added at a time during the production of the ultimate product instead of during the production of the casein itself. For instance, in the manufacture of ice cream an unhydrolyzed univalent cation caseinate could be mixed with the other ingredients of the ice cream mix, and, as a separate ingredient, there could be embodied in the mix the proper quantity of bivalent cation slowly reacting weak alkaline compound. In this way, the same desirable results would be had as if the bivalent cation compound were incorporated during the production of the casein itself. For this reason, the invention in its broadest aspect, contemplates the combination of univalent cation compounds, bivalent cation compounds, and casein, in food products whether in the form of a caseinate or in the form of an ordinary food product and regardless of the point in the process of production of the material at which one of the alkaline compounds is incorporated.

What I claim is:

1. The method of producing a soluble edible casein, the steps of combining with the casein a univalent cation slowly reacting weak alkaline compound of the group of sodium bicarbonate, ammonium carbonate and potassium carbonate and a bivalent cation slowly reacting weak alkaline compound of the group of calcium hydroxide and magnesium hydroxide.

2. The method of producing soluble edible casein which comprises preparing a liquid suspension of acid precipitated casein, removing whey and free acid from said casein, reducing the acidity of said casein by treating the same while wet with a univalent cation slowly reacting weak alkaline compound of the group of sodium bicarbonate, ammonium carbonate and potassium carbonate and with a bivalent cation slowly reacting weak alkaline compound of the group of calcium hydroxide and magnesium hydroxide, heating and dissolving the treated casein, and then reducing the casein to a dry state.

3. The method of producing soluble edible casein which comprises preparing a liquid suspension of acid precipitated casein, removing whey and free acid from said casein, reducing the acidity of said casein by treating the same while wet with a univalent cation slowly reacting weak alkaline compound of the group of sodium bicarbonate, ammonium carbonate and potassium carbonate and with calcium hydroxide, heating and dissolving the treated casein, and then reducing said casein to a dry state.

4. The method of producing soluble edible casein, which comprises preparing a liquid suspension of acid precipitated casein, removing whey and free acid from said casein, reducing the acidity of said casein by treating the same while wet with sodium bicarbonate and calcium hydroxide, heating and dissolving the treated casein, and then reducing said casein to a dry state.

5. The method of producing an edible milk product containing soluble casein, which consists in preparing a liquid suspension of acid precipitated casein, removing whey and free acid from said casein, reducing the acidity of said casein by treating the same while wet with a univalent cation slowly reacting weak alkaline compound of the group of sodium bicarbonate, ammonium carbonate and potassium carbonate and with a slowly reacting weak alkaline compound of a bivalent cation of the group of calcium hydroxide and magnesium hydroxide, forming a solution of the treated casein with sugar added thereto, and then reducing said solution to a dry powdered state.

6. An edible soluble casein having chemically combined therein a univalent cation compound of the group of sodium bicarbonate, ammonium carbonate and potassium carbonate and a bivalent cation compound of the group of calcium hydroxide and magnesium hydroxide.

7. An edible food product containing soluble casein chemically combined with a univalent cation compound of the group of sodium bicarbonate, ammonium carbonate and potassium carbonate and a bivalent cation compound of the group of calcium hydroxide and magnesium hydroxide.

8. An edible soluble casein having chemically combined therein a univalent cation compound of the group of sodium bicarbonate, ammonium carbonate and potassium carbonate and a bivalent cation compound of the group of calcium hydroxide and magnesium hydroxide.

9. An edible soluble casein having chemically combined therein sodium bicarbonate and calcium hydroxide.

10. The method of producing an edible food product consisting essentially of milk, which comprises incorporating in said product an edible soluble casein having chemically combined therewith a univalent cation slowly reacting weak alkaline compound of the group of sodium bicarbonate, ammonium carbonate and potassium carbonate and a bivalent cation slowly reacting weak alkaline compound of the group of calcium hydroxide and magnesium hydroxide.

11. The method of producing soluble edible casein, which comprises preparing a liquid suspension of acid precipitated casein, removing whey and free acid from said casein, reducing the acidity of said casein by treating the same while wet with sodium carbonate and with a slowly reacting weak alkaline compound of a bivalent cation of the group of calcium hydroxide and magnesium hydroxide, heating and dissolving the treated casein, and then reducing said casein to a dry state.

ARTHUR C. DAHLBERG.